United States Patent
Zhang

(10) Patent No.: US 11,359,919 B2
(45) Date of Patent: Jun. 14, 2022

(54) CALCULATING VEHICLE STATES OF A VEHICLE SYSTEM FOR LANE CENTERING

(71) Applicant: Aptiv Technologies Limited, St. Michael (BB)

(72) Inventor: Guoguang Zhang, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 201 days.

(21) Appl. No.: 16/593,552

(22) Filed: Oct. 4, 2019

(65) Prior Publication Data

US 2021/0102810 A1 Apr. 8, 2021

(51) Int. Cl.
*G01C 21/16* (2006.01)
*G07C 5/02* (2006.01)

(52) U.S. Cl.
CPC .............. *G01C 21/16* (2013.01); *G07C 5/02* (2013.01)

(58) Field of Classification Search
CPC combination set(s) only.
See application file for complete search history.

(56) References Cited

U.S. PATENT DOCUMENTS

| | | | |
|---|---|---|---|
| 5,136,513 A | 8/1992 | Sol et al. | |
| 8,311,858 B2 * | 11/2012 | Everett | G07C 5/008 705/4 |
| 9,739,689 B2 | 8/2017 | Singh | |
| 9,995,654 B2 | 6/2018 | Singh | |
| 10,124,809 B2 | 11/2018 | Thor et al. | |
| 2008/0059034 A1* | 3/2008 | Lu | B60T 8/17552 701/71 |
| 2016/0244068 A1* | 8/2016 | Thor | B60W 40/101 |
| 2019/0049260 A1* | 2/2019 | Gaither | B60K 1/00 |

FOREIGN PATENT DOCUMENTS

| | | | | |
|---|---|---|---|---|
| CN | 104590276 A | 5/2015 | | |
| CN | 104590276 B | 2/2017 | | |
| EP | 3115765 A1 * | 1/2017 | | B60C 19/00 |
| EP | 3023761 B1 | 4/2019 | | |
| JP | 2011201404 | 10/2011 | | |

(Continued)

OTHER PUBLICATIONS

"Extended European Search Report", EP Application No. 20199783.0, dated Feb. 26, 2021, 7 pages.

(Continued)

*Primary Examiner* — Aniss Chad
*Assistant Examiner* — Christopher George Fees
(74) *Attorney, Agent, or Firm* — Sawtooth Patent Group PLLC

(57) ABSTRACT

A system includes an inertial navigation system module (INS module) that detects vehicle yaw rates and vehicle lateral speeds, a controller circuit communicatively coupled with the INS module. The controller circuit determines a tire cornering stiffness ($C_f$, $C_r$) based on vehicle physical parameters and vehicle dynamic parameters. The controller circuit determines a vehicle moment of inertia (Iz) based on the vehicle physical parameters, the vehicle dynamic parameters, and the tire cornering stiffness ($C_f$, $C_r$).

48 Claims, 2 Drawing Sheets

(56) References Cited

FOREIGN PATENT DOCUMENTS

| WO | 2009004194 | 1/2009 | |
|---|---|---|---|
| WO | 2016135317 | 9/2016 | |
| WO | WO-2016135317 A1 * | 9/2016 | ........... G01G 19/086 |

OTHER PUBLICATIONS

Sivaramakrishnan, "Simultaneous identification of tire cornering stiffnesses and vehicle center of gravity", Jun. 2008, pp. 2846-2851.
Fault-type Identification And Fault Estimation Of The Active Steering System Of An Electric Vehicle In Normal Driving Conditions, Proc. IMechE Part D: J Automobile Engineering 2017, vol. 231(12) pp. 1679-1692, IMechE 2017, Zhang, et. al.

* cited by examiner

CALCULATING VEHICLE STATES OF A VEHICLE SYSTEM FOR LANE CENTERING

TECHNICAL FIELD OF DISCLOSURE

This disclosure generally relates to a vehicle system that determines a real-time vehicle moment of inertia.

BACKGROUND OF THE DISCLOSURE

Typical vehicle lane centering algorithms rely on the vehicle's tire cornering stiffness and vehicle moment of inertia. Changes to tire pressure, tire aging, vehicle load changes, and other vehicle parameters may lead to changes of vehicle's tire cornering stiffness and vehicle moment of inertia, thus leading to possible degradation in the lane centering algorithm's performance.

SUMMARY OF THE DISCLOSURE

An example of a vehicle system an inertial navigation system module that detects vehicle yaw rates and vehicle lateral speeds, and a controller circuit communicatively coupled with the INS module. The controller circuit determines a tire cornering stiffness ($C_f$, $C_r$) based on vehicle physical parameters and vehicle dynamic parameters. The controller circuit determines a vehicle moment of inertia ($I_z$) based on the vehicle physical parameters, the vehicle dynamic parameters, and the tire cornering stiffness ($C_f$, $C_r$).

In an example having one or more features of the vehicle system of the previous paragraph, the tire cornering stiffness ($C_f$, $C_r$) and the vehicle moment of inertia ($I_z$) are determined in real-time as the vehicle is traveling on a roadway.

In an example having one or more features of the vehicle system of the previous paragraph, the tire cornering stiffness ($C_f$, $C_r$) is determined by the equation, $$\begin{bmatrix} C_f \\ C_r \end{bmatrix} = mldivide \left( \begin{bmatrix} a[1] & b[1] \\ a[2] & b[2] \\ \vdots & \\ a[n] & b[n] \end{bmatrix}, \begin{bmatrix} c[1] \\ c[2] \\ \vdots \\ c[n] \end{bmatrix} \right),$$

where $a[i] = -\dfrac{vy[i]}{mvx[i]} - \dfrac{r[i]l_f}{mvx[i]} + \dfrac{\delta[i]}{m}$, $b[i] = -\dfrac{vy[i]}{mvx[i]} - \dfrac{r[i]l_r}{mvx[i]}$, and $c[i] = vx[i]r[i]$.

In an example having one or more features of the vehicle system of the previous paragraph, the vehicle moment of inertia ($I_z$) is determined by the equation, $$I_z = \frac{T_s}{C_{Iz}}, \text{ where}$$

$$C_{Iz} = mldivide \left( \begin{bmatrix} d[1] \\ d[2] \\ \vdots \\ d[n-1] \end{bmatrix}, \begin{bmatrix} r[2] - r[1] \\ r[3] - r[2] \\ \vdots \\ r[n] - r[n-1] \end{bmatrix} \right), \text{ and}$$

$d[i] = -\dfrac{vy[i]}{vx[i]}(C_r l_r - C_f l_f) - \dfrac{r[i]}{vx[i]}(C_r l_r^2 + C_f l_f^2) + C_f l_f \delta[i]$.

In an example having one or more features of the vehicle system of any of the previous paragraphs, the controller circuit stores initial vehicle dynamic parameters in an array with at least 200 samples for each parameter when the vehicle is started.

In an example having one or more features of the vehicle system of the previous paragraph, the controller circuit periodically updates the vehicle dynamic parameters stored in the array.

In an example having one or more features of the vehicle system of any of the previous paragraphs, the controller circuit updates the vehicle dynamic parameters stored in the array at a sampling frequency ($T_s$) of less than about 0.01 seconds per sample.

In an example having one or more features of the vehicle system of any of the previous paragraphs, the vehicle dynamic parameters include a plurality of longitudinal speeds (vx) from a vehicle speed sensor, a plurality of steering angles ($\delta$) from a road wheel steering angle sensor, a plurality of vehicle yaw rates (r), and a plurality of vehicle lateral speeds (vy).

In an example having one or more features of the vehicle system of any of the previous paragraphs, the vehicle physical parameters include a vehicle mass (m), a front axle distance ($l_f$) to a vehicle center of gravity (COG), and a rear axle distance ($l_r$) to the COG.

In an example having one or more features of the vehicle system of any of the previous paragraphs, the vehicle mass (m) is adjusted based on a fuel tank level.

In an example having one or more features of the vehicle system of any of the previous paragraphs, the vehicle includes an occupant detection system and the vehicle mass (m) is adjusted based on a number of occupants.

In an example having one or more features of the vehicle system of any of the previous paragraphs, the controller circuit determines the tire cornering stiffness ($C_f$, $C_r$) when a variation in a plurality of vehicle lateral speeds (vy) is less than a first threshold.

In an example having one or more features of the vehicle system of any of the previous paragraphs, The system of claim 12, wherein the variation in the plurality of vehicle lateral speeds (vy) is determined by the equation, $$\frac{|vy\_max - vy\_min|}{|vy\_max| + |vy\_min|}.$$

In an example having one or more features of the vehicle system of any of the previous paragraphs, when the variation in the plurality of vehicle lateral speeds (vy) is greater than the first threshold, the controller circuit updates the array and recalculates the variation in the plurality of vehicle lateral speeds (vy).

In an example having one or more features of the vehicle system of any of the previous paragraphs, the first threshold is a fixed threshold.

In an example having one or more features of the vehicle system of any of the previous paragraphs, the first threshold is 0.05.

In an example having one or more features of the vehicle system of any of the previous paragraphs, the first threshold is a dynamic threshold.

In an example having one or more features of the vehicle system of any of the previous paragraphs, the dynamic threshold is based on a longitudinal speed (vx) of the vehicle.

In an example having one or more features of the vehicle system of any of the previous paragraphs, the controller circuit determines the vehicle moment of inertia ($I_z$) when a variation in a plurality of vehicle yaw rates (r) is greater than a second threshold.

In an example having one or more features of the vehicle system of any of the previous paragraphs, the variation in the plurality of vehicle yaw rates (r) is determined by the equation, $$\frac{|r\_max - r\_min|}{|r\_max| + |r\_min|}.$$

In an example having one or more features of the vehicle system of any of the previous paragraphs, when the variation in the plurality of vehicle yaw rates (r) is less than the second threshold, the controller circuit updates the array and recalculates the variation the plurality of vehicle yaw rates (r).

In an example having one or more features of the vehicle system of any of the previous paragraphs, the second threshold is a fixed threshold.

In an example having one or more features of the vehicle system of any of the previous paragraphs, the second threshold is 0.25.

In an example having one or more features of the vehicle system of any of the previous paragraphs, the second threshold is a dynamic threshold.

In an example having one or more features of the vehicle system of any of the previous paragraphs, the dynamic threshold is based on a longitudinal speed (vx) of the vehicle.

An example of a method of operating a vehicle system includes detecting vehicle yaw rates and vehicle lateral speeds with an inertial navigation system module (INS module), determining, with a controller circuit communicatively coupled with the INS module, a tire cornering stiffness ($C_f$, $C_r$) based on vehicle physical parameters and vehicle dynamic parameters, and determining, with the controller circuit, a vehicle moment of inertia ($I_z$) based on the vehicle physical parameters, the vehicle dynamic parameters, and the tire cornering stiffness ($C_f$, $C_r$).

In an example having one or more features of the method of operating a vehicle system of the previous paragraph, the tire cornering stiffness ($C_f$, $C_r$) and the vehicle moment of inertia ($I_z$) are determined in real-time as the vehicle is traveling on a roadway.

In an example having one or more features of the method of operating a vehicle system of the previous paragraph, wherein the tire cornering stiffness ($C_f$, $C_r$) is determined by the equation, $$\begin{bmatrix} C_f \\ C_r \end{bmatrix} = mldivide \left( \begin{bmatrix} a[1] & b[1] \\ a[2] & b[2] \\ \vdots \\ a[n] & b[n] \end{bmatrix}, \begin{bmatrix} c[1] \\ c[2] \\ \vdots \\ c[n] \end{bmatrix} \right), \text{ where.}$$

$$a[i] = -\frac{vy[i]}{mvx[i]} - \frac{r[i]l_f}{mvx[i]} + \frac{\delta[i]}{m},$$

$$b[i] = -\frac{vy[i]}{mvx[i]} - \frac{r[i]l_r}{mvx[i]}, \text{ and}$$

$$c[i] = vx[i]r[i].$$

In an example having one or more features of the method of operating a vehicle system the previous paragraph, the vehicle moment of inertia ($I_z$) is determined by the equation, $$I_z = \frac{T_s}{C_{Iz}}, \text{ where}$$

$$C_{Iz} = mldivide \left( \begin{bmatrix} d[1] \\ d[2] \\ \vdots \\ d[n-1] \end{bmatrix}, \begin{bmatrix} r[2] - r[1] \\ r[3] - r[2] \\ \vdots \\ r[n] - r[n-1] \end{bmatrix} \right), \text{ and}$$

$$d[i] = -\frac{vy[i]}{vx[i]}(C_r l_r - C_f l_f) - \frac{r[i]}{vx[i]}(C_r l_r^2 + C_f l_f^2) + C_f l_f \delta[i].$$

In an example having one or more features of the method of operating a vehicle system of any of the previous paragraphs, the controller circuit stores initial vehicle dynamic parameters in an array with at least 200 samples for each parameter when the vehicle is started.

In an example having one or more features of the method of operating a vehicle system of any of the previous paragraphs, the controller circuit periodically updates the vehicle dynamic parameters stored in the array.

In an example having one or more features of the method of operating a vehicle system of any of the previous paragraphs, the controller circuit updates the vehicle dynamic parameters stored in the array at a sampling frequency ($T_s$) of less than about 0.01 seconds per sample.

In an example having one or more features of the method of operating a vehicle system of any of the previous paragraphs, the vehicle dynamic parameters include a plurality of longitudinal speeds (vx) from a vehicle speed sensor, a plurality of steering angles ($\delta$) from a road wheel steering angle sensor, a plurality of vehicle yaw rates (r), and a plurality of vehicle lateral speeds (vy).

In an example having one or more features of the method of operating a vehicle system of any of the previous paragraphs, the vehicle physical parameters include a vehicle mass (m), a front axle distance ($l_f$) to a vehicle center of gravity (COG), and a rear axle distance ($l_r$) to the COG.

In an example having one or more features of the method of operating a vehicle system of any of the previous paragraphs, the vehicle mass (m) is adjusted based on a fuel tank level.

In an example having one or more features of the method of operating a vehicle system of any of the previous paragraphs, the vehicle includes an occupant detection system and the vehicle mass (m) is adjusted based on a number of occupants.

In an example having one or more features of the method of operating a vehicle system of any of the previous paragraphs, the controller circuit determines the tire cornering stiffness ($C_f$, $C_r$) when a variation in a plurality of vehicle lateral speeds (vy) is less than a first threshold.

In an example having one or more features of the method of operating a vehicle system of any of the previous paragraphs, the variation in the plurality of vehicle lateral speeds (vy) is determined by the equation, $$\frac{|vy\_max - vy\_min|}{|vy\_max| + |vy\_min|}.$$

In an example having one or more features of the method of operating a vehicle system of any of the previous paragraphs, when the variation in the plurality of vehicle lateral speeds (vy) is greater than the first threshold, the controller circuit updates the array and recalculates the variation in the plurality of vehicle lateral speeds (vy).

In an example having one or more features of the method of operating a vehicle system of any of the previous paragraphs, the first threshold is a fixed threshold.

In an example having one or more features of the method of operating a vehicle system of any of the previous paragraphs, the first threshold is 0.05.

In an example having one or more features of the method of operating a vehicle system of any of the previous paragraphs, the first threshold is a dynamic threshold.

In an example having one or more features of the method of operating a vehicle system of any of the previous paragraphs, the dynamic threshold is based on a longitudinal speed (vx) of the vehicle.

In an example having one or more features of the method of operating a vehicle system of any of the previous paragraphs, the controller circuit determines the vehicle moment of inertia ($I_z$) when a variation in a plurality of vehicle yaw rates (r) is greater than a second threshold.

In an example having one or more features of the method of operating a vehicle system of any of the previous paragraphs, the variation in the plurality of vehicle yaw rates (r) is determined by the equation, $$\frac{|r\_max - r\_min|}{|r\_max| + |r\_min|}.$$

In an example having one or more features of the method of operating a vehicle system of any of the previous paragraphs, when the variation in the plurality of vehicle yaw rates (r) is less than the second threshold, the controller circuit updates the array and recalculates the variation the plurality of vehicle yaw rates (r).

In an example having one or more features of the method of operating a vehicle system of any of the previous paragraphs, the second threshold is a fixed threshold.

In an example having one or more features of the method of operating a vehicle system of any of the previous paragraphs, the second threshold is 0.25.

In an example having one or more features of the method of operating a vehicle system of any of the previous paragraphs, the second threshold is a dynamic threshold.

In an example having one or more features of the method of operating a vehicle system of any of the previous paragraphs, the dynamic threshold is based on a longitudinal speed (vx) of the vehicle.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
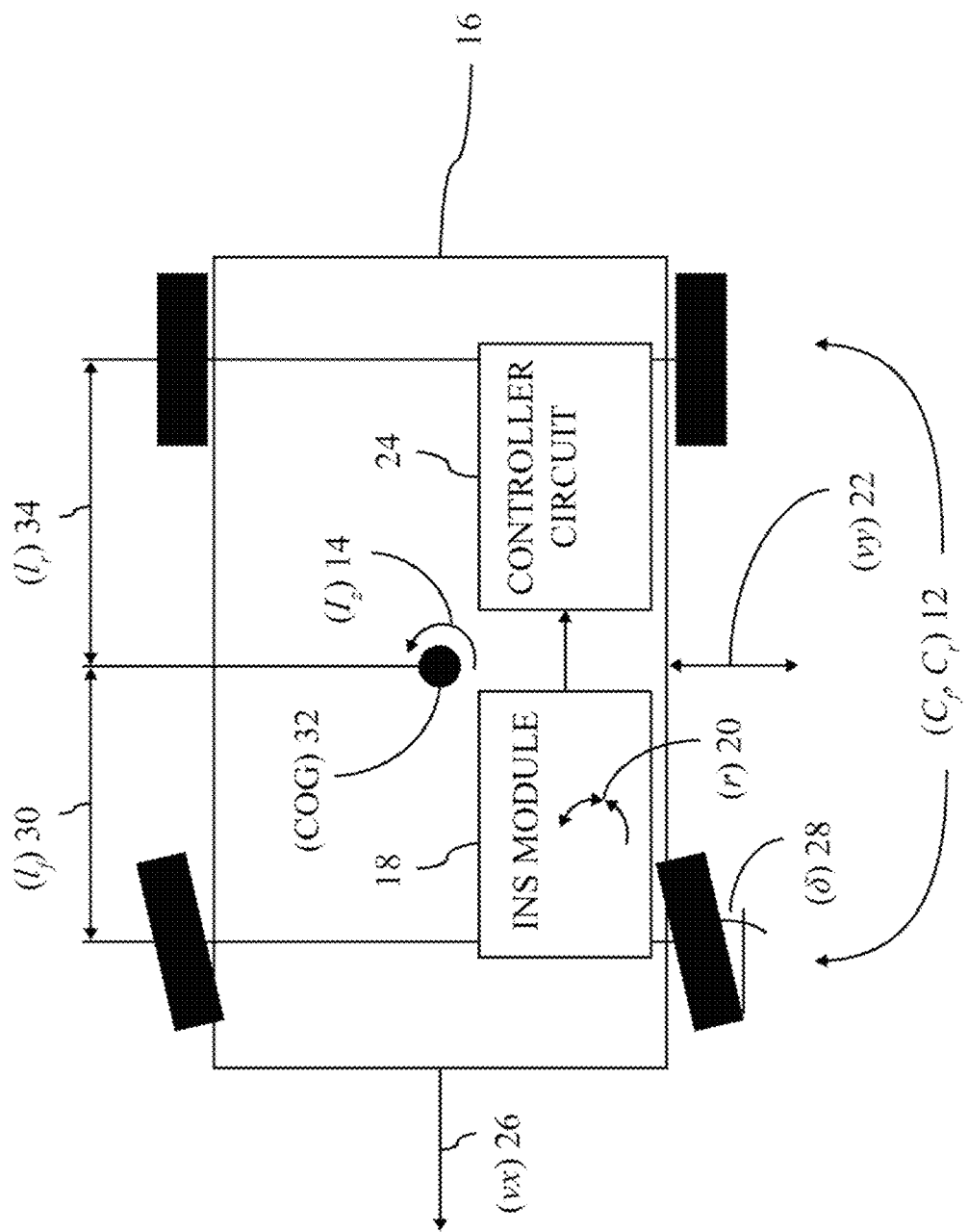
FIG. 1 is an illustration of a vehicle system in accordance with one embodiment.

FIG. 1 illustrates a vehicle system 10, hereafter the system 10, that determines a tire cornering stiffness ($C_f$, $C_r$) 12, and a vehicle moment of inertia ($I_z$) 14, as a vehicle 16 is traveling on a roadway. As used herein, the tire cornering stiffness ($C_f$, $C_r$) 12 includes both a front tire cornering stiffness (i.e., $C_f$), and a rear tire cornering stiffness (i.e., $C_r$). The system 10 may offer improvements over other systems, because the system 10 determines the tire cornering stiffness ($C_f$, $C_r$) 12 and the vehicle moment of inertia ($I_z$) 14 of the vehicle 16 in real-time. In some examples, lane centering algorithms use model-based control design methods, such as conventional state-feedback control, linear quadratic regulator (LQR), and model predictive control (MPC). The effectiveness of the model-based control design relies on the accuracy of a vehicle model. If the vehicle model used for control design is not accurate, the performance of model-based control design is degraded. Variation of the tire cornering stiffness ($C_f$, $C_r$) 12 and vehicle moment of inertia ($I_z$) 14 affects the accuracy of the vehicle model. Accurate, real-time determination of the parameters of tire cornering stiffness ($C_f$, $C_r$) 12 and vehicle moment of inertia ($I_z$) 14 may lead to a more accurate vehicle model, and to greater effectiveness of the model-based lane centering algorithms. In an example, the tire cornering stiffness ($C_f$, $C_r$) 12 is affected by tire pressure, tire aging, vehicle load and load distribution. In an example, the vehicle moment of inertia ($I_z$) 14 is affected by vehicle load and load distribution. This real-time determination may improve a performance of the lane centering algorithm that may be installed in the vehicle 16, enabling the lane centering algorithm to operate more effectively as vehicle parameters vary.

The system 10 includes an inertial navigation system module 18 (INS module 18) that detects vehicle yaw rates (r) 20 and vehicle lateral speeds (vy) 22. The INS module 18 (sometimes referred to as INS+GNSS) includes an inertial measurement unit (IMU), and a global navigation satellite system (GNSS) receiver. The GNSS receiver may receive signals from orbiting satellites from any of the known satellite systems, including Global Positioning System (GPS), Globalnaya Navigazionnaya Sputnikovaya Sistema (GLONASS), BeiDou Navigation Satellite System (BDS), and Galileo global navigation satellite system. The IMU detects vehicle angular accelerations in three axes to determine vehicle yaw rates (r) 20, and also detects vehicle linear accelerations in three axes. Signals from the IMU are fused with vehicle position signals from the GNSS receiver to detect the vehicle lateral speeds (vy) 22. The INS module 18 may be any INS module 18 suitable for vehicle applications, such as the RT2000, manufactured by Oxford Technical Solutions Ltd., of Oxfordshire, United Kingdom.

The system 10 also includes a controller circuit 24 communicatively coupled with the INS module 18. The controller circuit 24 may include a processor (not shown) such as a microprocessor or other control circuitry such as analog and/or digital control circuitry. The control circuitry may include one or more application-specific integrated circuits (ASICs) or field programmable gate arrays (FPGAs) that are programmed to perform the techniques, or may include one or more general purpose hardware processors programmed to perform the techniques pursuant to program instructions in firmware, memory, other storage, or a combination. The controller circuit 24 may also combine custom hard-wired logic, ASICs, or FPGAs with custom programming to accomplish the techniques. The controller circuit 24 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying special programming signals. The controller circuit 24 may include other examples of non-volatile memory, such as flash memory, read-only memory (ROM), programmable read-only memory (PROM), and erasable programmable read-only memory (EPROM). The controller circuit 24 may include volatile memory, such as dynamic random-access memory (DRAM), static random-access memory (SRAM). The one or more routines may be executed by the processor to perform steps for determining the tire cornering stiffness ($C_f$, $C_r$) 12 and the vehicle moment of inertia ($I_z$) 14 in real-time, based on signals received by the controller circuit 24 from the INS module 18 as described herein. In an example, the INS module 18 includes the controller circuit 24 (i.e., the controller circuit 24 is integral to the INS module 18 electrical packaging). In another example, the INS module 18 and the controller circuit 24 are separate devices.

The controller circuit 24 determines the tire cornering stiffness ($C_f$, $C_r$) 12 based on vehicle physical parameters and vehicle dynamic parameters. The vehicle dynamic parameters are variables that include a plurality of longitudinal speeds (vx) 26 from a vehicle speed sensor (not shown), a plurality of steering angles ($\delta$) 28 from a road wheel steering angle sensor (not shown), a plurality of vehicle yaw rates (r) 20 from the IMU, and a plurality of vehicle lateral speeds (vy) 22 from the INS module 18. In an example, the vehicle speed sensor is a wheel speed sensor mounted on a wheel hub. In another example, the vehicle speed sensor is integrated with an anti-lock braking system (ABS) that may be installed on the vehicle 16. In another example, the vehicle speed sensor is the GNSS receiver. The road wheel steering angle sensor may be mounted to a knuckle assembly of the vehicle 16, or may be derived from a steering wheel angle sensor mounted to a steering column that may be installed the vehicle 16. In an example, the various vehicle sensors communicate with the controller circuit 24 via a controller area network bus (CAN bus—not shown).

The vehicle physical parameters include a vehicle mass (m), a front axle distance ($l_f$) 30 to a vehicle center of gravity 32 (COG 32), and a rear axle distance ($l_r$) 34 to the COG 32. In an example, the vehicle mass (m) is a known parameter stored in the memory of the controller circuit 24 that is the curb weight of the vehicle 16. The curb weight is defined as a total mass of the vehicle 16, including standard equipment and all necessary operating consumables such as motor oil, transmission oil, coolant, air conditioning refrigerant, and sometimes a full tank of fuel. The curb weight does not include passengers or cargo. In another example, the vehicle mass (m) is adjusted based on a fuel tank level (i.e., the level of fuel in the fuel tank). In yet another example, the vehicle 16 includes an occupant detection system and the vehicle mass (m) is adjusted based on a number of occupants riding in the vehicle 16. In yet another example, the vehicle 16 includes a self-leveling suspension system, and the vehicle mass (m) is adjusted based on an amount of leveling required that may be indicative of the additional cargo load and/or a weight of the passengers and cargo.

The controller circuit 24 determines the vehicle moment of inertia ($I_z$) 14 about a vertical axis (i.e., the z-axis) of the vehicle 16 that is orthogonal to both a longitudinal axis (i.e., the x-axis) and a lateral axis (i.e., the y-axis) as illustrated in FIG. 1. The vehicle moment of inertia ($I_z$) 14 is based on the vehicle physical parameters, the vehicle dynamic parameters, and the tire cornering stiffness ($C_f$, $C_r$) 12. The vehicle moment of inertia ($I_z$) 14 is a quantity that determines the torque needed for a desired angular acceleration about a rotational axis (i.e. the z-axis of the vehicle) and is used in the lane centering algorithm (not shown).

The tire cornering stiffness ($C_f$, $C_r$) 12 is determined by the equation, $$\begin{bmatrix} C_f \\ C_r \end{bmatrix} = mldivide\left(\begin{bmatrix} a[1] & b[1] \\ a[2] & b[2] \\ \vdots & \vdots \\ a[n] & b[n] \end{bmatrix}, \begin{bmatrix} c[1] \\ c[2] \\ \vdots \\ c[n] \end{bmatrix}\right), \text{where.}$$

$$a[i] = -\frac{vy[i]}{mvx[i]} - \frac{r[i]l_f}{mvx[i]} + \frac{\delta[i]}{m},$$

$$b[i] = -\frac{vy[i]}{mvx[i]} - \frac{r[i]l_r}{mvx[i]}, \text{ and}$$

$$c[i] = vx[i]r[i].$$

These equations are derived from the "bicycle model" equations, as shown below. The bicycle model is a kinematic model of lateral vehicle motion. The bicycle model is typically used for trajectory planning and control. The bicycle model is a simplified model of the vehicle 16 where the front tires are lumped together as a single tire, and the rear tires are also lumped together as a single tire. Other assumptions include, but are not limited to, only the front wheels are steerable, and the pitch and roll rotations of the vehicle 16 occur about the COG 32 of the vehicle 16.

Bicycle Model Equations:

$$\dot{v}_y = \frac{-(c_f + c_r)}{mv_x}v_y + \left[\frac{(\ell_r c_r - \ell_f c_f)}{mv_x} - v_x\right]r + \frac{c_f}{m}\delta$$

$$\dot{r} = \frac{\ell_r c_r - \ell_f c_f}{I_z v_x}v_y + \frac{-(\ell_f^2 c_f + \ell_r^2 c_r)}{I_z v_x}r + \frac{\ell_f c_f}{m}\delta.$$

The function "mldivide" is an algorithm developed by the MathWorks, Inc., of Natick, Mass., USA, and offered in their MATLAB® software suite, that, in this example, is used to divide one array by another array.

The terms a[i], b[i] and c[i] include the vehicle physical parameters which are stored in the memory of the controller circuit 24, and the vehicle dynamic parameters which are received by the controller circuit 24 from their respective sensors, as described above. In an example, the controller circuit 24 stores initial vehicle dynamic parameters and the vehicle physical parameters in a first set of arrays as shown in the equation above for $$\begin{bmatrix} C_f \\ C_r \end{bmatrix},$$

with at least 200 samples (i.e., n=200) for each parameter when the vehicle 16 is started. In this example, the controller circuit 24 records the at least 200 samples at a sampling frequency ($T_s$) of less than about 0.01 seconds per sample. This sampling frequency ($T_s$) provides an acceptable balance between the performance of the system 10, and the required memory capacity used by the system 10. Once the controller circuit 24 has initialized the first set of arrays, the controller circuit 24 periodically updates the first set of arrays while the vehicle is traveling on the roadway with data for the vehicle dynamic parameters, and any of the vehicle physical parameters that may have changed (e.g., the vehicle mass (m)). The controller circuit 24 periodically updates the first set of arrays at the defined sampling frequency ($T_s$) described above.

In an example, the controller circuit 24 determines the tire cornering stiffness ($C_f$, $C_r$) 12 when a variation in a plurality of vehicle lateral speeds (vy) 22 is less than a first threshold. In this example, the variation in the plurality of vehicle lateral speeds (vy) 22 is determined by the equation, $$\frac{|vy\_max - vy\_min|}{|vy\_max| + |vy\_min|},$$

where vy_max and vy_min are maximum and minimum values of the plurality of vehicle lateral speeds (vy) 22 stored in the arrays of at least 200 samples. In an example, the first threshold is a fixed threshold. In this example, the first threshold is 0.05, or 5% of the total range of the plurality of vehicle lateral speeds (vy) 22 stored in the arrays. In this example the first threshold of 0.05 is sufficiently low so that the vehicle lateral motion is in a quasi-steady state mode. This quasi-steady state mode improves an accuracy of the measurement of the tire cornering stiffness ($C_f$, $C_r$) 12.

In another example, the first threshold is a dynamic threshold. In this example, the dynamic threshold is based on the longitudinal speed (vx) 26 of the vehicle. In an example, the dynamic threshold increases as the longitudinal speed (vx) 26 of the vehicle increases. In another example, the dynamic threshold decreases as the longitudinal speed (vx) 26 of the vehicle increases.

In an example, when the variation in the plurality of vehicle lateral speeds (vy) 22 is greater than the first threshold (i.e., not in the quasi-steady state mode), the controller circuit 24 updates the first set of arrays with the vehicle dynamic parameters and the vehicle physical parameters, and recalculates the variation in the plurality of vehicle lateral speeds (vy) 22. That is, the controller circuit 24 samples the sensors and repeats the calculation of the variation in the plurality of vehicle lateral speeds (vy) 22. The controller circuit 24 repeats this cycle of sampling and calculation until the variation is less than the first threshold before determining the tire cornering stiffness ($C_f$, $C_r$) 12.

Once the tire cornering stiffness ($C_f$, $C_r$) 12 is determined by the controller circuit 24, the controller circuit 24 determines the vehicle moment of inertia ($I_z$) 14 by the equation, $$I_z = \frac{T_s}{C_{Iz}}, \text{ where}$$

$$C_{Iz} = mldivide\left(\begin{bmatrix} d[1] \\ d[2] \\ \vdots \\ d[n-1] \end{bmatrix}, \begin{bmatrix} r[2] - r[1] \\ r[3] - r[2] \\ \vdots \\ r[n] - r[n-1] \end{bmatrix}\right), \text{ and}$$

-continued
$$d[i] = -\frac{vy[i]}{vx[i]}(C_r l_r - C_f l_f) - \frac{r[i]}{vx[i]}(C_r l_r^2 + C_f l_f^2) + C_f l_f \delta[i].$$

These equations are also derived from the "bicycle model" equations, as described above. The controller circuit 24 stores the vehicle dynamic parameters and the vehicle physical parameters in a second set of arrays, as shown in the equation above for $C_{Iz}$, with at least 200 samples for each parameter. The second set of arrays are populated while the vehicle 16 is traveling on the roadway at the preferred sampling frequency ($T_s$) of less than about 0.01 seconds per sample. The term d[i] in the second set of arrays includes the tire cornering stiffness ($C_f$, $C_r$) 12 coefficients and the vehicle dynamic parameters. The variable (r) 20 is the plurality of vehicle yaw rates (r) 20. Once the controller circuit 24 has initialized the second set of arrays, the controller circuit 24 periodically updates the second set of arrays with the vehicle dynamic parameters and any of the vehicle physical parameters that may have changed (e.g., the vehicle mass (m)), at the defined sampling frequency ($T_s$).

In an example, the controller circuit 24 determines the vehicle moment of inertia ($I_z$) 14 when a variation in a plurality of vehicle yaw rates (r) 20 is greater than a second threshold. In this example, the controller circuit 24 determines the variation in the plurality of vehicle yaw rates (r) 20 by the equation, $$\frac{|r\_max - r\_min|}{|r\_max| + |r\_min|},$$

where r_max and r_min are maximum and minimum values of the vehicle yaw rates (r) 20 stored in the second set of arrays of at least 200 samples. In an example, the second threshold is a fixed threshold. In this example, the second threshold is 0.25, or 25% of the total range of the plurality of the vehicle yaw rates (r) 20 in the second set of arrays. In this example the second threshold of 0.25 is sufficiently high so that the vehicle rotational motion is indicative of a non-steady state mode. The non-steady state mode improves an accuracy of the measurement of the vehicle moment of inertia (k) 14.

In another example, the second threshold is a dynamic threshold. In this example, the dynamic threshold is based on the longitudinal speed (vx) 26 of the vehicle 16. In an example, the dynamic threshold increases as the longitudinal speed (vx) 26 of the vehicle 16 increases. In another example, the dynamic threshold decreases as the longitudinal speed (vx) 26 of the vehicle 16 increases.

In an example, when the variation in the plurality of vehicle yaw rates (r) 20 is less than the second threshold (i.e., insufficient excitation to the model), the controller circuit 24 updates the second set of arrays with the vehicle dynamic parameters and the vehicle physical parameters, and recalculates the variation in the plurality of vehicle yaw rates (r) 20. That is, the controller circuit 24 samples the sensors and repeats the calculation of the variation in the plurality of vehicle yaw rates (r) 20. The controller circuit 24 repeats this cycle of sampling and calculation until the variation is greater than the second threshold before determining the vehicle moment of inertia ($I_z$) 14.

Figure 2:
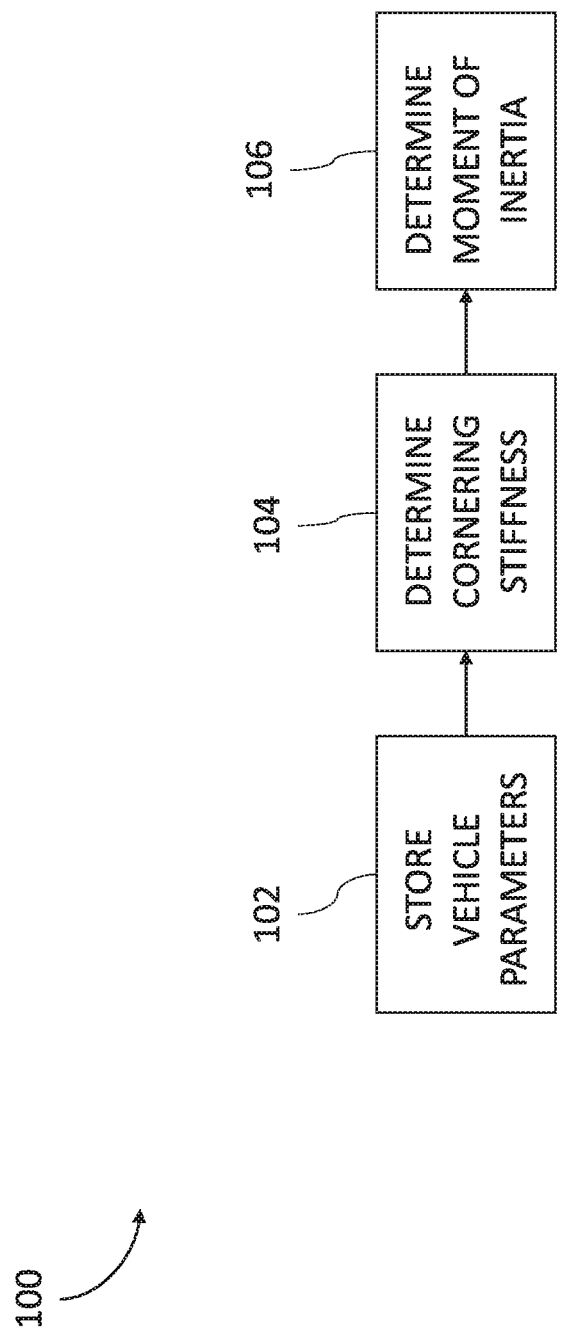
FIG. 2 is a flow chart illustrating a method of operating the vehicle system of FIG. 1 in accordance with another embodiment.

FIG. 2 is a flow chart illustrating an example of a method 100 of operating the system 10.

Step 102, STORE VEHICLE PARAMETERS, includes storing, in the controller circuit 24, vehicle physical parameters and vehicle dynamic parameters in a first set of arrays, as described above. The vehicle physical parameters include the vehicle mass (m), the front axle distance ($l_f$) 30 to the vehicle COG 32, and the rear axle distance ($l_r$) 34 to the COG 32. The vehicle dynamic parameters are variables that include the plurality of longitudinal speeds (vx) 26 from the vehicle speed sensor, the plurality of steering angles (δ) 28 from the road wheel steering angle sensor, the plurality of vehicle yaw rates (r) 20 from the IMU, and the plurality of vehicle lateral speeds (vy) 22 from the INS module 18, as described above. The controller circuit 24 is communicatively coupled with the INS module 18, and receives data from the various sensors via the CAN bus.

In an example, the controller circuit 24 stores initial vehicle dynamic parameters and the vehicle physical parameters in a first set of arrays when the vehicle 16 is started, as described above, and periodically updates the first set of arrays while the vehicle 16 is traveling on the roadway. In an example, the controller circuit 24 determines the tire cornering stiffness ($C_f$, $C_r$) 12 when a variation in a plurality of vehicle lateral speeds (vy) 22 is less than a first threshold as described above. In an example, the first threshold is a fixed threshold of 0.05. In another example, the first threshold is a dynamic threshold that may be based on the longitudinal speed (vx) 26 of the vehicle 16 as described above.

In an example, when the variation in the plurality of vehicle lateral speeds (vy) 22 is greater than the first threshold, the controller circuit 24 updates the first set of arrays with the vehicle dynamic parameters and the vehicle physical parameters, and recalculates the variation in the plurality of vehicle lateral speeds (vy) 22. The controller circuit 24 repeats this cycle of sampling and calculation until the variation is less than the first threshold before determining the tire cornering stiffness ($C_f$, $C_r$) 12.

Step 104, DETERMINE CORNERING STIFFNESS, includes determining, with the controller circuit 24, the tire cornering stiffness ($C_f$, $C_r$) 12 by the equation, $$\begin{bmatrix} C_f \\ C_r \end{bmatrix} = mldivide\left(\begin{bmatrix} a[1] & b[1] \\ a[2] & b[2] \\ \vdots & \vdots \\ a[n] & b[n] \end{bmatrix}, \begin{bmatrix} c[1] \\ c[2] \\ \vdots \\ c[n] \end{bmatrix}\right), \text{where.}$$

$$a[i] = -\frac{vy[i]}{mvx[i]} - \frac{r[i]l_f}{mvx[i]} + \frac{\delta[i]}{m},$$

$$b[i] = -\frac{vy[i]}{mvx[i]} - \frac{r[i]l_r}{mvx[i]}, \text{ and } c[i] = vx[i]r[i].$$

These equations are derived from the "bicycle model" equations, as described above. The terms a[i], b[i] and c[i] include the vehicle physical parameters which are stored in the memory of the controller circuit 24, and the vehicle dynamic parameters which are received by the controller circuit 24 from their respective sensors, as described above.

Step 106, DETERMINE MOMENT OF INERTIA, includes determining, with the controller circuit 24, the vehicle moment of inertia ($I_z$) 14 about the z-axis of the vehicle 16 that is orthogonal to both the x-axis the y-axis, as illustrated in FIG. 1. The vehicle moment of inertia ($I_z$) 14 is based on the vehicle physical parameters, the vehicle dynamic parameters, and the tire cornering stiffness ($C_f$, $C_r$)

12. The controller circuit 24 determines the vehicle moment of inertia ($I_z$) 14 by the equation, $$I_z = \frac{T_S}{C_{Iz}}, \text{ where}$$

$$C_{Iz} = mldivide\left(\begin{bmatrix} d[1] \\ d[2] \\ \vdots \\ d[n-1] \end{bmatrix}, \begin{bmatrix} r[2]-r[1] \\ r[3]-r[2] \\ \vdots \\ r[n]-r[n-1] \end{bmatrix}\right), \text{ and}$$

$$d[i] = -\frac{vy[i]}{vx[i]}(C_r l_r - C_f l_f) - \frac{r[i]}{vx[i]}(C_r l_r^2 + C_f l_f^2) + C_f l_f \delta[i].$$

These equations are also derived from the "bicycle model" equations as described above. The controller circuit 24 stores the vehicle dynamic parameters and the vehicle physical parameters in the second set of arrays, and periodically updates the second set of arrays while the vehicle 16 is traveling on the roadway as described above. The term d[i] in the second set of arrays includes the tire cornering stiffness ($C_f$, $C_r$) 12 coefficients and the vehicle dynamic parameters. The variable (r) 20 is the plurality of vehicle yaw rates (r) 20.

In an example, the controller circuit 24 determines the vehicle moment of inertia ($I_z$) 14 when a variation in a plurality of vehicle yaw rates (r) 20 is greater than a second threshold, as described above. In an example, the second threshold is a fixed threshold that is 0.25. In another example, the second threshold is a dynamic threshold that may be based on the longitudinal speed (vx) 26 of the vehicle 16 as described above. In an example, when the variation in the plurality of vehicle yaw rates (r) 20 is less than the second threshold, the controller circuit 24 updates the second set of arrays with the vehicle dynamic parameters and the vehicle physical parameters, and recalculates the variation in the plurality of vehicle yaw rates (r) 20. The controller circuit 24 repeats this cycle of sampling and calculation until the variation is greater than the second threshold before determining the vehicle moment of inertia ($I_z$) 14.

Accordingly, a vehicle system 10 and a method 100 of operating the vehicle system 10 are provided. The vehicle system 10 may provide advantages over other systems because the vehicle system 10 determines the tire cornering stiffness ($C_f$, $C_r$) 12 and the vehicle moment of inertia ($I_z$) 14 in real-time while the vehicle 16 is traveling on the roadway.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

I claim:

1. A system, comprising:
an inertial navigation system (INS) that detects vehicle yaw rates and vehicle lateral speeds of a vehicle system; and
a controller circuit communicatively coupled with the INS such that the controller circuit and the INS enable the system to, in real-time as the vehicle system is moving:
use vehicle physical parameters of the vehicle system and vehicle dynamic parameters of the vehicle system in a lane centering algorithm for the vehicle system, the vehicle dynamic parameters including at least a plurality of vehicle lateral speeds (vy) of the vehicle system and a plurality of vehicle yaw rates (r) of the vehicle system;
update the vehicle dynamic parameters by updating the plurality of vehicle lateral speeds and the plurality of vehicle yaw rates using the INS;
determine a first steady state mode of the updated plurality of vehicle lateral speeds and a second steady state mode of the updated plurality of vehicle yaw rates;
calculate, for the vehicle system, a tire cornering stiffness ($C_f$, $C_r$) using at least the vehicle physical parameters and the updated vehicle dynamic parameters when the first steady state mode indicates a steady state for the updated plurality of vehicle lateral speeds;
calculate, for the vehicle system and using the controller circuit, a vehicle moment of inertia ($I_z$) based on at least the vehicle physical parameters, the updated vehicle dynamic parameters, and the tire cornering stiffness when the second steady state mode indicates a non-steady state for the updated plurality of vehicle yaw rates; and
provide, using the calculated tire cornering stiffness or the calculated vehicle moment of inertia, the vehicle system with an updated output of the lane centering algorithm for operating the vehicle system.

2. The system of claim 1, further enabled to:
determine the tire cornering stiffness using an equation:

$$\begin{bmatrix} C_f \\ C_r \end{bmatrix} = mldivide\left(\begin{bmatrix} a[1] & b[1] \\ a[2] & b[2] \\ \vdots & \vdots \\ a[n] & b[n] \end{bmatrix}, \begin{bmatrix} c[1] \\ c[2] \\ \vdots \\ c[n] \end{bmatrix}\right), \text{ where.}$$

$$a[i] = -\frac{vy[i]}{mvx[i]} - \frac{r[i]l_f}{mvx[i]} + \frac{\delta[i]}{m},$$

$$b[i] = -\frac{vy[i]}{mvx[i]} - \frac{r[i]l_r}{mvx[i]}, \text{ and } c[i] = vx[i]r[i].$$

3. The system of claim 1, further enabled to:
determine the vehicle moment of inertia using an equation:

$$I_z = \frac{T_S}{C_{Iz}}, \text{ where}$$

$$C_{Iz} = mldivide\left(\begin{bmatrix} d[1] \\ d[2] \\ \vdots \\ d[n-1] \end{bmatrix}, \begin{bmatrix} r[2]-r[1] \\ r[3]-r[2] \\ \vdots \\ r[n]-r[n-1] \end{bmatrix}\right), \text{ and}$$

$$d[i] = -\frac{vy[i]}{vx[i]}(C_r l_r - C_f l_f) - \frac{r[i]}{vx[i]}(C_r l_r^2 + C_f l_f^2) + C_f l_f \delta[i].$$

4. The system of claim 1, further enabled to:
store, using the controller circuit, the vehicle dynamic parameters in an array with at least 200 samples for each parameter when the vehicle system is started.

5. The system of claim 4, further enabled to:
periodically store, using the controller circuit, the vehicle dynamic parameters stored in the array.

6. The system of claim 5, further enabled to:
store, using the controller circuit, the updated vehicle dynamic parameters in the array at a sampling frequency ($T_s$) of less than 0.01 seconds per sample.

7. The system of claim 1, wherein the vehicle dynamic parameters further include a plurality of longitudinal speeds (vx) from a vehicle speed sensor and a plurality of steering angles ($\delta$) from a road wheel steering angle sensor.

8. The system of claim 1, wherein the vehicle physical parameters include a vehicle mass (m), a front axle distance ($l_f$) to a vehicle center of gravity (COG), and a rear axle distance ($l_r$) to the COG.

9. The system of claim 8, further enabled to:
adjust the vehicle mass based on a fuel tank level.

10. The system of claim 8, wherein the vehicle system includes an occupant detection system, and the system is further enabled to:
adjust the vehicle mass based on a number of occupants detected by the occupant detection system.

11. The system of claim 1, wherein the system is further enabled to:
calculate a first variation of the updated plurality of vehicle lateral speeds; and
determine the first steady state mode indicates the steady state for the updated plurality of vehicle lateral speeds when the first variation is less than a first threshold.

12. The system of claim 11, wherein the system is further enabled to:
calculate the first variation of the updated plurality of vehicle lateral speeds using an equation:

$$\frac{|vy\_max - vy\_min|}{|vy\_max| + |vy\_min|}.$$

13. The system of claim 11, wherein the first threshold is a fixed threshold.

14. The system of claim 11, wherein the first threshold is 0.05.

15. The system of claim 11, wherein the first threshold is a dynamic threshold.

16. The system of claim 15, wherein the dynamic threshold is based on a longitudinal speed (vx) of the vehicle system.

17. The system of claim 1, further enabled to:
calculate a first variation of the updated plurality of vehicle lateral speeds;
determine the first steady state mode indicates a non-steady state for the updated plurality of vehicle lateral speeds when the first variation is greater than a first threshold; and
in response to determining the first steady state mode indicates the non-steady state for the updated plurality of vehicle lateral speeds, repeatedly update an array with an additional plurality of vehicle lateral speeds and calculate the first variation of the additional plurality of vehicle lateral speeds until the first variation of the additional plurality of vehicle lateral speeds is less than the first threshold.

18. The system of claim 1, further enabled to:
calculate a second variation for the updated plurality of vehicle yaw rates; and
determine the second steady state mode indicates a non-steady state when the second variation is greater than a second threshold.

19. The system of claim 18, wherein the system is further enabled to:
calculate the second variation of the updated plurality of vehicle yaw rates using an equation:

$$\frac{|r\_max - r\_min|}{|r\_max| + |r\_min|}.$$

20. The system of claim 18, wherein the second threshold is a fixed threshold.

21. The system of claim 20, wherein the second threshold is 0.25.

22. The system of claim 1, further configured to:
calculate a second variation for the updated plurality of vehicle yaw rates;
determine the second steady state mode indicates a steady state for the updated plurality of vehicle yaw rates when the second variation is less than a second threshold; and
in response to determining the second steady state mode indicates the steady state for the updated plurality of vehicle yaw rates, repeatedly update an array that stores the updated plurality of vehicle yaw rates with an additional plurality of vehicle yaw rates and calculate the second variation using the additional plurality of vehicle yaw rates until the second variation is higher than the second threshold.

23. The system of claim 22, wherein the second threshold is a dynamic threshold.

24. The system of claim 23, wherein the dynamic threshold is based on a longitudinal speed (vx) of the vehicle system.

25. A method of operating a system, comprising:
in real-time as the vehicle system is moving:
using vehicle physical parameters of a vehicle system and vehicle dynamic parameters of the vehicle system in a lane centering algorithm for the vehicle system, the vehicle dynamic parameters including at least a plurality of vehicle lateral speeds (vy) of the vehicle system and a plurality of vehicle yaw rates (r) of the vehicle system;
updating the vehicle dynamic parameters by updating the plurality of vehicle yaw rates and the plurality of vehicle lateral speeds using an inertial navigation system (INS);
determining a first steady state mode of the updated plurality of vehicle lateral speeds and a second steady state mode of the updated plurality of vehicle yaw rates;
calculating, for the vehicle system, a tire cornering stiffness ($C_f$, $C_r$) using at least the vehicle physical parameters and the updated vehicle dynamic parameters when the first steady state mode indicates a steady state for the updated plurality of vehicle lateral speeds;
calculating, for the vehicle system, a vehicle moment of inertia (L) based on at least the vehicle physical parameters, the updated vehicle dynamic parameters, and the tire cornering stiffness when the second steady state mode indicates a non-steady state for the updated plurality of vehicle yaw rates; and
providing, using the calculated tire cornering stiffness or the calculated vehicle moment of inertia, the vehicle system with an updated output of the lane centering algorithm for operating the vehicle system.

26. The method of claim 25, wherein determining the tire cornering stiffness further comprises:
determining the tire cornering stiffness using an equation:

$$\begin{bmatrix} C_f \\ C_r \end{bmatrix} = mldivide \left( \begin{bmatrix} a[1] & b[1] \\ a[2] & b[2] \\ \vdots & \vdots \\ a[n] & b[n] \end{bmatrix} \begin{bmatrix} c[1] \\ c[2] \\ \vdots \\ c[n] \end{bmatrix} \right), \text{ where:}$$

$$a[i] = -\frac{vy[i]}{mvx[i]} - \frac{r[i]l_f}{mvx[i]} + \frac{\delta[i]}{m}, \quad b[i] = -\frac{vy[i]}{mvx[i]} - \frac{r[i]l_r}{mvx[i]}, \text{ and}$$

$$c[i] = vx[i]r[i].$$

27. The method of claim 25, further comprising:
determining the vehicle moment of inertia using an equation:

$$I_z = \frac{T_S}{C_{I_z}}, \text{ where}$$

$$C_{I_z} = mldivide \left( \begin{bmatrix} d[1] \\ d[2] \\ \vdots \\ d[n-1] \end{bmatrix}, \begin{bmatrix} r[2] - r[1] \\ r[3] - r[2] \\ \vdots \\ r[n] - r[n-1] \end{bmatrix} \right), \text{ and}$$

$$d[i] = -\frac{vy[i]}{vx[i]}(C_r l_r - C_f l_f) - \frac{r[i]}{vx[i]}(C_r l_r^2 + C_f l_f^2) + C_f l_f \delta[i].$$

28. The method of claim 25, further comprising:
storing the vehicle dynamic parameters in an array with at least 200 samples for each parameter when the vehicle system is started.

29. The method of claim 28, further comprising:
periodically storing the updated vehicle dynamic parameters in the array.

30. The method of claim 29, further comprising:
storing the updated plurality of vehicle lateral speeds or the updated plurality of vehicle yaw rates in the array at a sampling frequency ($T_s$) of less than 0.01 seconds per sample.

31. The method of claim 25, wherein the vehicle dynamic parameters further include a plurality of longitudinal speeds (vx) from a vehicle speed sensor and a plurality of steering angles ($\delta$) from a road wheel steering angle sensor.

32. The method of claim 25, wherein the vehicle physical parameters include a vehicle mass (m), a front axle distance ($l_f$) to a vehicle center of gravity (COG), and a rear axle distance ($l_r$) to the COG.

33. The method of claim 32, further comprising:
adjusting the vehicle mass (m) based on a fuel tank level.

34. The method of claim 32, further comprising:
adjusting the vehicle mass based on a number of occupants detected by an occupant detection.

35. The method of claim 25, further comprising:
calculating a first variation of the updated plurality of vehicle lateral speeds;
determining the first steady state mode indicates the steady state for the updated plurality of vehicle lateral speeds when the first variation of the updated plurality of vehicle lateral speeds is less than a first threshold.

36. The method of claim 35, wherein calculating the first variation of the updated plurality of vehicle lateral speeds further comprises:
calculating the first variation using an equation comprising:

$$\frac{|vy\_max - vy\_min|}{|vy\_max| + |vy\_min|}.$$

37. The method of claim 35, wherein the first threshold is a fixed threshold.

38. The method of claim 35, wherein the first threshold is 0.05.

39. The method of claim 35, wherein the first threshold is a dynamic threshold.

40. The method of claim 39, wherein the dynamic threshold is based on a longitudinal speed (vx) of the vehicle system.

41. The method of claim 25, further comprising:
calculating a first variation of the updated plurality of vehicle lateral speeds;
determining the first steady state mode indicates a non-steady state for the updated plurality of vehicle lateral speeds when the first variation is greater than a first threshold; and
in response to determining the first steady state mode indicates the non-steady state for the updated plurality of vehicle lateral speeds, repeatedly updating an array that stores the updated plurality of vehicle lateral speeds with an additional plurality of vehicle lateral speeds and recalculating the first variation using the additional plurality of vehicle lateral speeds until the first variation of the additional plurality of vehicle lateral speeds is less than the first threshold.

42. The method of claim 25, further comprising:
calculating a second variation for the updated plurality of vehicle yaw rates; and
determining the second steady state mode indicates a non-steady state when the second variation is greater than a second threshold.

43. The method of claim 42, wherein calculating a second variation further comprises:
calculating the second variation of the plurality of vehicle yaw rates using an equation:

$$\frac{|r\_max - r\_min|}{|r\_max| + |r\_min|}.$$

44. The method of claim 25, further comprising:
calculating a second variation for the updated plurality of vehicle yaw rates;
determining the second steady state mode indicates a steady state for the updated plurality of vehicle yaw rates when the second variation is less than a second threshold; and
repeatedly updating an array that stores the updated plurality of vehicle yaw rates with an additional plurality of vehicle yaw rates and recalculate the second variation using the additional plurality of vehicle yaw rates until the second variation is higher than the second threshold.

45. The method of claim 42, wherein the second threshold is a fixed threshold.

46. The method of claim 45, wherein the second threshold is 0.25.

47. The method of claim 44, wherein the second threshold is a dynamic threshold.

48. The method of claim 47, wherein the dynamic threshold is based on a longitudinal speed (vx) of the vehicle system.

* * * * *